(12) United States Patent
Glaspey

(10) Patent No.: US 8,834,098 B2
(45) Date of Patent: Sep. 16, 2014

(54) DETUNED VANE AIRFOIL ASSEMBLY

(75) Inventor: James Glaspey, Farmington, CT (US)

(73) Assignee: United Technologies Corporation, Hartford, CT (US)

( * ) Notice: Subject to any disclaimer, the term of this patent is extended or adjusted under 35 U.S.C. 154(b) by 527 days.

(21) Appl. No.: 13/310,228

(22) Filed: Dec. 2, 2011

(65) Prior Publication Data

US 2013/0142659 A1 Jun. 6, 2013

(51) Int. Cl.
*F01D 5/14* (2006.01)
*F01D 5/16* (2006.01)

(52) U.S. Cl.
USPC .......................................... 415/119

(58) Field of Classification Search
CPC .............. F01D 5/16; F01D 5/26; F01D 5/28; F01D 5/282; F01D 9/02; F01D 25/005; F01D 25/04; F01D 25/06; F04D 29/384; F04D 29/388; F05D 2300/40–2300/48
USPC .............. 415/119, 182.1, 183, 185, 191, 194, 415/195, 200, 232
See application file for complete search history.

(56) References Cited

U.S. PATENT DOCUMENTS

| | | | |
|---|---|---|---|
| 2,916,258 A * | 12/1959 | Klint | ............................ 416/203 |
| 4,022,547 A | 5/1977 | Stanley | |
| 5,022,824 A | 6/1991 | Violette et al. | |
| 5,102,300 A | 4/1992 | Violette et al. | |
| 5,454,693 A | 10/1995 | Aubry et al. | |
| 5,474,421 A | 12/1995 | Rossmann | |
| 6,379,112 B1 | 4/2002 | Montgomery | |
| 6,471,482 B2 | 10/2002 | Montgomery et al. | |
| 7,278,830 B2 | 10/2007 | Vetters | |
| 7,383,136 B1 | 6/2008 | Griffin et al. | |
| 7,384,240 B2 | 6/2008 | McMillan et al. | |
| 7,429,165 B2 | 9/2008 | Burdgick et al. | |
| 7,500,299 B2 | 3/2009 | Dupeux et al. | |
| 7,766,625 B2 | 8/2010 | Burdgick et al. | |
| 2002/0181867 A1 * | 12/2002 | Chan et al. | ...................... 385/37 |
| 2005/0278127 A1 | 12/2005 | Griffin et al. | |
| 2007/0036658 A1 | 2/2007 | Morris | |
| 2007/0140857 A1 | 6/2007 | Booth et al. | |
| 2007/0231155 A1 | 10/2007 | Burdgick et al. | |
| 2007/0292265 A1 | 12/2007 | Burdgick et al. | |
| 2008/0220207 A1 | 9/2008 | Ravey | |
| 2009/0068015 A1 | 3/2009 | Powell et al. | |
| 2009/0185911 A1 | 7/2009 | Roberge | |
| 2010/0247310 A1 | 9/2010 | Kelly et al. | |
| 2012/0070270 A1 * | 3/2012 | Ravey et al. | ................... 415/119 |

* cited by examiner

*Primary Examiner* — Ned Landrum
*Assistant Examiner* — Brian O Peters
(74) *Attorney, Agent, or Firm* — Kinney & Lange, P.A.

(57) ABSTRACT

A vane assembly comprises circumferentially adjacent airfoils formed of composite materials. The airfoils have matching exterior geometries defined by pressure and suction surfaces extending axially from a leading edge to a trailing edge and radially from a root section to a tip section. An inner platform is attached to each of the circumferentially adjacent airfoils at the root section, and an outer platform is attached at the tip section. The composite materials are selected to define a vibration mode with different vibration frequencies in the circumferentially adjacent airfoils, where the different vibration frequencies are separated by more than a full width of the vibration mode at half maximum.

20 Claims, 3 Drawing Sheets

DETUNED VANE AIRFOIL ASSEMBLY

BACKGROUND

This invention relates generally to turbomachinery, and specifically to stator vanes for the compressor or fan section of a gas turbine engine. In particular, the invention concerns a compressor or fan assembly with vibration damped stator vane airfoils.

Gas turbine engines provide reliable, efficient power for a wide range of applications, including aviation and industrial power generation. In modern applications, the gas turbine is typically built around a power core made up of a compressor, combustor and turbine section, arranged in flow series with an upstream inlet and downstream exhaust.

The compressor section compresses air from the inlet, which is mixed with fuel in the combustor and ignited to generate hot combustion gas. The turbine section extracts energy from the expanding combustion gas, and drives the compressor via a common shaft. Energy is delivered in the form of rotational energy in the shaft, reactive thrust from the exhaust, or both.

Small-scale gas turbine engines generally utilize a one-spool design, with co-rotating compressor and turbine sections. Larger-scale combustion turbines, jet engines and industrial gas turbines (IGTs) are typically arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, and to generate lift for conversion to rotational energy in the turbine.

Aviation applications include turbojet, turbofan, turboprop and turboshaft configurations. Turbojets are an older design, in which thrust is generated primarily from the exhaust. Modern fixed-wing aircraft typically employ turbofan and turboprop engines, in which the low pressure spool is coupled to a propulsion fan or propeller. Turboshaft engines are used on rotary-wing aircraft, including helicopters.

In turbofan engines, the fan rotor typically operates as a first stage compressor, or as the pre-compressor stage for a low-pressure compressor or booster module. Fan and compressor airfoils are thus subject to similar design considerations, and the term compressor blade may encompass both the fan and compressor sections.

Both compressor and fan airfoils are also subject to operational effects, including natural mode excitations, for example, in the low pressure stages, where airfoil dimensions and vibration amplitudes can be large. These vibrations impose a range of corresponding engineering constraints, including the need for strong, durable and impact-resistant airfoil designs, in lightweight, cost-effective configurations with increased service life and reliability. With respect to vibration response, however, rotor and stator stages may have substantially different characteristics, particularly for unshrouded (fixed-free) rotor blades, as opposed to shrouded (fixed-fixed) stator vanes.

SUMMARY

This invention concerns a vane assembly for a stator stage in the fan or compressor section of a gas turbine engine. The assembly includes a plurality of circumferentially arranged vane airfoils having a composite construction, with matching exterior geometries.

The airfoils are defined between pressure and suction surfaces extending axially from a leading edge to a trailing edge, and radially from a root section to a tip section. An inner platform is attached to the airfoil at the root section, and an outer platform is attached at the tip section.

The composite materials are selected for vibration response, in order to define vibration modes with different frequencies in circumferentially adjacent airfoils. Thus, adjacent airfoils have matching external geometry, but different vibration frequencies. In particular, the different frequencies are separated by at least a full width of the mode at half maximum, in order to increase damping and improve performance and service life.

DETAILED DESCRIPTION

Figure 1:
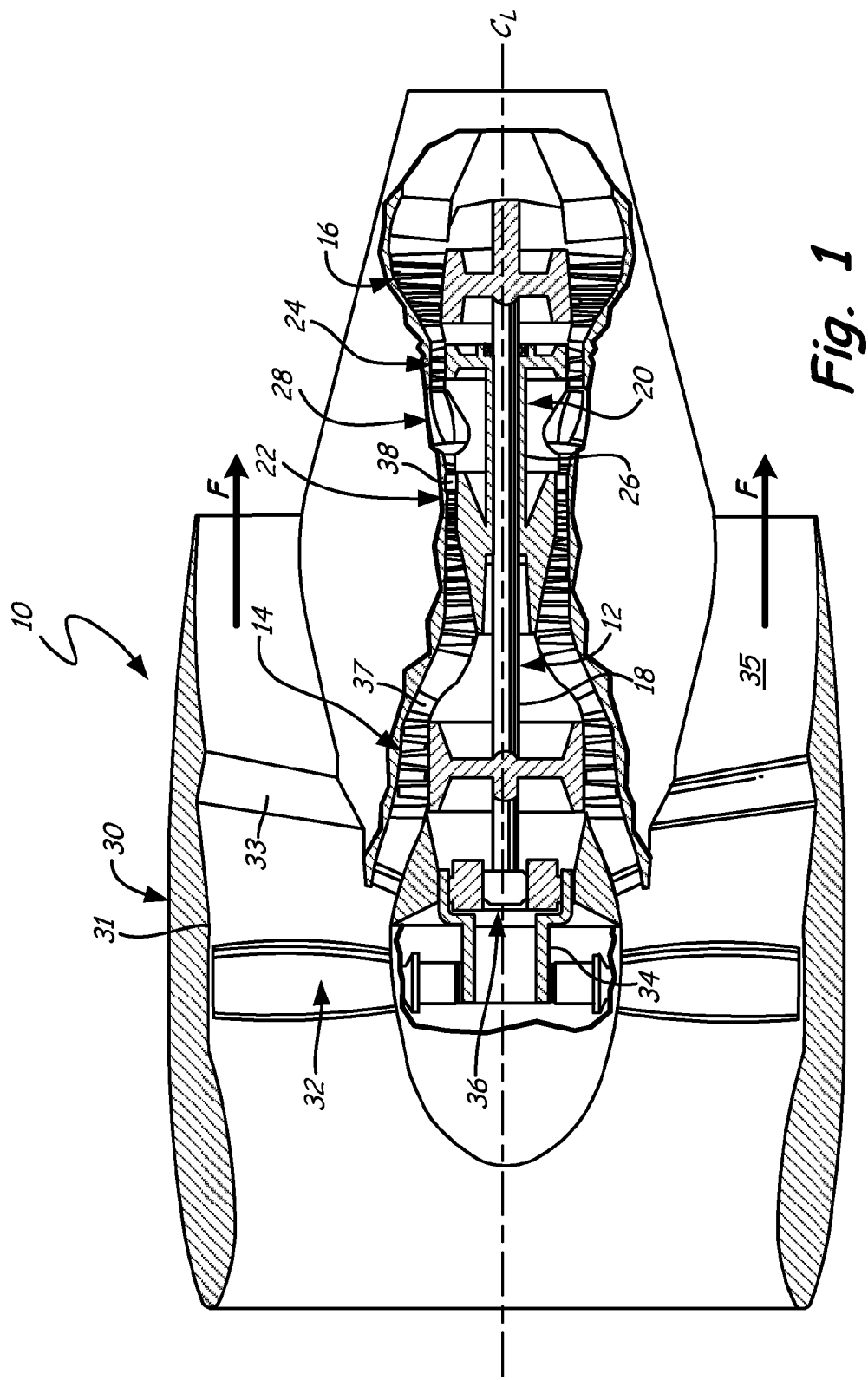
FIG. 1 is a cross-sectional view of a gas turbine engine.

FIG. 1 is a cross-sectional view of gas turbine engine 10, in a two-spool turbofan configuration for use as a propulsion engine on an aircraft. As shown in the figure, low spool 12 includes low pressure compressor (LPC) 14 and low pressure turbine (LPT) 16, rotationally coupled via low pressure shaft 18. High spool 20 includes high pressure compressor (HPC) 22 and high pressure turbine (HPT) 24, rotationally coupled via high pressure shaft 26. High spool 20 is coaxially oriented about low spool 12, along engine centerline (or turbine axis) $C_L$, with combustor 28 positioned in flow series between high pressure compressor 22 and high pressure turbine 24.

Nacelle 30 is oriented about the forward end of gas turbine engine 10. Fan casing 31 extends along on the radially inner surface of nacelle 30, from propulsion fan 32 to fan exit guide vane (FEGV) 33. Fan 32 is rotationally coupled to low spool 12 via fan shaft 34, generating propulsive flow F through fan duct (or bypass duct) 35. In advanced engine designs, fan drive gear system 36 couples fan shaft 34 to low spool 12 at low pressure shaft 18, providing independent fan speed control for reduced noise and improved operating efficiency.

As shown in FIG. 1, gas turbine engine 10 includes stator vane stages distributed throughout the compressor and fan sections of low spool 12 and high spool 20. These vane stages include, but are not limited to, highly loaded stator stages such as fan exit guide vanes 33, LPC exit guide vanes 37 for low pressure compressor 14, and HPC exit guide vanes 38 for high pressure compressor 22.

The stator stages are formed by arranging a number of vane airfoils 33, 37 and 38 circumferentially about turbine axis $C_L$, with inner and outer endwalls defining an annular fan or compressor duct for working fluid flow. In addition to exit guide vanes 33, 37 and 38, additional stator stages are positioned within low pressure compressor 14 and high pressure compressor 22, and in transition ducts located between the different fan and compressor sections.

During operation of gas turbine engine 10, vane airfoils 33, 37 and 38 are subject to substantial loading and vibration effects, including operationally-induced excitations of natural vibration modes. Generally speaking, the lowest-order or fundamental vibration modes have the lowest frequency, and may be relatively easy to excite. Higher-order modes can be harder to excite, particularly at large amplitude, but the higher-order modes also have higher vibration frequencies, and correspondingly higher vibration energy.

To damp engine vibrations across a broad range of natural resonances and mode frequencies, vanes 33, 37 and 38 are formed of organic matrix composite (OMC) materials, including fiber materials embedded in an organic matrix. Organic matrix composite materials are difficult to excite at high vibratory stress levels, because they absorb vibration energy and damp mechanical oscillations. In addition, adjacent vane airfoils are formed with different organic matrix compositions, with different structural, mechanical and vibration characteristics, detuning the vibration response of the stator stage and increasing damping capability.

Figure 2:
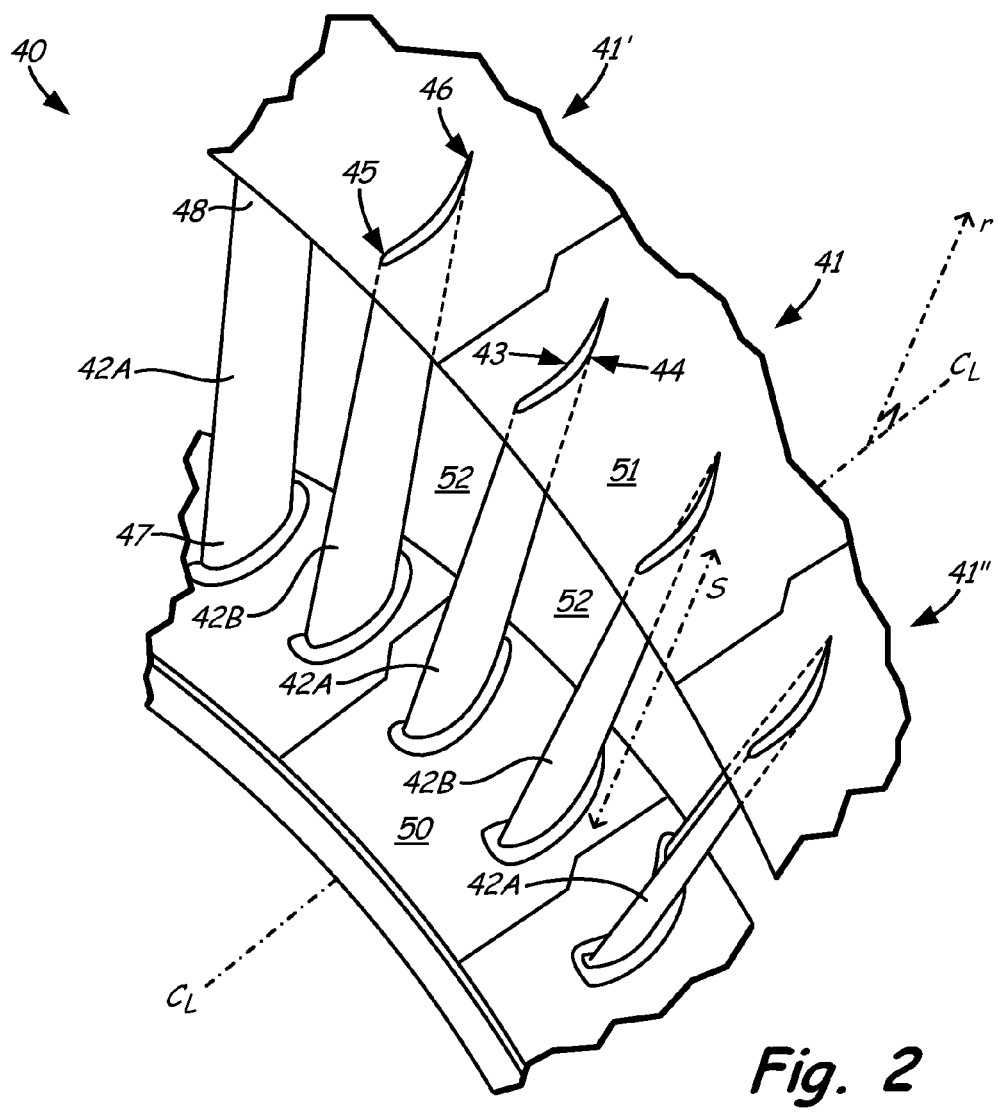
FIG. 2 is a perspective view of a stator stage for the gas turbine engine, showing an airfoil assembly with circumferentially adjacent vane airfoils.

FIG. 2 is a perspective view of stator stage 40 for a gas turbine engine, for example stator vane stage 33, 37 or 38 of turbofan engine 10, as shown in FIG. 1, or another compressor or fan stage. Vane stage 40 is formed of a number of individual vane assemblies 41, 41', 41", etc., with pairs (or other multiples) of circumferentially adjacent airfoil sections 42A and 42B arranged circumferentially about turbine axis $C_L$.

Adjacent airfoil sections 42A and 42B in each vane assembly 41 have matching external geometry, blade loading and turning properties, but are formed of different organic matrix composite materials selected for different vibration characteristics, in order to detune the vibration response of stator stage 40. Similarly, circumferentially adjacent airfoil sections 42A and 42B in adjacent vane assemblies 41' and 41" also have different vibration characteristics, not necessarily the same as those of airfoils 42A and 42B in vane assembly 41. Thus, the overall vibration response of stator stage 40 is detuned, not only with respect to adjacent vane airfoils 42A and 42B in each vane assembly 41, but also with respect to adjacent vane assemblies 41' and 41", as circumferentially arranged about turbine centerline $C_L$ in stator stage 40.

Individual airfoil sections (or vane airfoils) 42A and 42B are defined between concave pressure surface 43 and convex suction surface 44, extending in an axial or chordwise direction from leading edge 45 to trailing edge 46, along turbine axis $C_L$. Leading and trailing edges 45 and 46 extend in a radial or spanwise direction from root section 47 to tip section 48, defining span height S along radius r, perpendicular to turbine axis $C_L$.

Circumferentially adjacent airfoils 42A and 42B are attached to ID platforms 50 at root section 47, and to OD platforms 51 at tip section 48, forming a compressor or fan duct for working fluid flow. OD and ID platforms 50 and 51 span two or more circumferentially adjacent vane airfoils 42A and 42B, forming individual vane assemblies 41, 41', and 41" as integral units.

In the particular configuration of FIG. 2, two or more adjacent airfoils 42A and 42B with different organic matrix compositions are coupled between ID and OD platforms (or endwall sections) 50 and 51, forming adjacent twin-pack or multi-pack stator vane assemblies 41, 41', 41". Alternatively, three, four or more adjacent airfoils 42A, 42B with different organic matrix compositions are coupled together, forming adjacent multi-vane or multi-pack vane assemblies 41, 41', 41".

Flow passages 52 are formed along the flow duct, as defined between ID platform 50 and OD platform 51, and between adjacent airfoil sections 42A and 42B. As shown in FIG. 2, airfoils 42A and 42B in each vane assembly 41, 41', 41" have different vibration characteristics but matching or substantially identical exterior geometries, with substantially identical pressure and suction surfaces 43 and 44 and span height S between ID and OD platforms 50 and 51. This provides adjacent vanes 42A and 42B in each vane assembly 41, 41', 41" with matching or substantially identical loading and flow turning characteristics, as described below.

Depending configuration, however, airfoil geometry may vary between and among different individual vane assemblies 41. In some exit guide vane configurations, for example, different vane classes and vane assemblies 41, 41', 41" are provided with variable airfoil geometries, in order generate a circumferentially-dependent (axially asymmetric) turning and load distribution. This allows flow to be directed around downstream structures such as struts, fairings and pylons. Alternatively, airfoils 42A and 42B in a number of adjacent vane assemblies 41, 41', 41" have the same geometry, turning and load characteristics, but each has different vibration characteristics, as described above.

Vane airfoils 42A and 42B are formed of organic matrix composite materials, including fiber materials embedded in an organic matrix. Suitable organic matrix materials include epoxy resins, polymer resins, and polyester, vinyl ester, phenolic, polyimide, polyamide and polypropylene matrix materials. Suitable fiber materials include carbon fibers, glass fibers, boron fibers, fiberglass, metal fibers, polyamide and bismaliamide fiber materials, and other polymer, carbon and metal fiber materials. A variety of different fiber weaves are also used, for example with parallel, perpendicular or random fiber orientations. Taken together, these different organic matrix material compositions and fiber orientations provide different airfoil sections 42A and 42B with different natural vibration frequencies. In addition, the organic matrix composition or fiber orientation, or both, may be varied within individual airfoil sections 42A and 42B, in order to provide different vibration characteristics as a function of fractional span height or axial chord location.

In large part, the shape and external geometry of adjacent airfoils 42A and 42B is driven by vibration response. Organic matrix composite materials improve design flexibility by providing substantially greater damping, as compared to metal and ceramic or refractory materials, due to the embedded fiber and matrix construction. In addition, the material composition, relative amounts, densities, orientations and spanwise distributions of the organic matrix and fiber materials are selected to define different vibration response functions for circumferentially adjacent airfoils 42A and 42B, detuning the vibration response of vane assemblies 41, 41', 42".

In particular, the organic matrix composite materials are selected to define vibration modes with different frequencies in adjacent airfoils 42A and 42B, including different fundamental (first-order) and higher-order (at least second and third order) mode frequencies. These differences in vibration response are sufficient for one adjacent vane 42A to be unresponsive (and therefore energy absorbing) under operating conditions where another adjacent vane 42B is responsive, as described below.

Detuning or "mis-tuning" the vibration response of adjacent airfoils 42A and 42B increases damping in vane assemblies 41, 41', 42", etc., reducing fatigue and increasing reliability and service life. These techniques also provide for a wider range of different airfoil geometries and vane shapes, which would otherwise be impractical due to high vibratory stresses. As a result, more efficient vane shapes and airfoil designs can be used in vane stage 40, with improved loading and flow turning characteristics.

Figure 3:
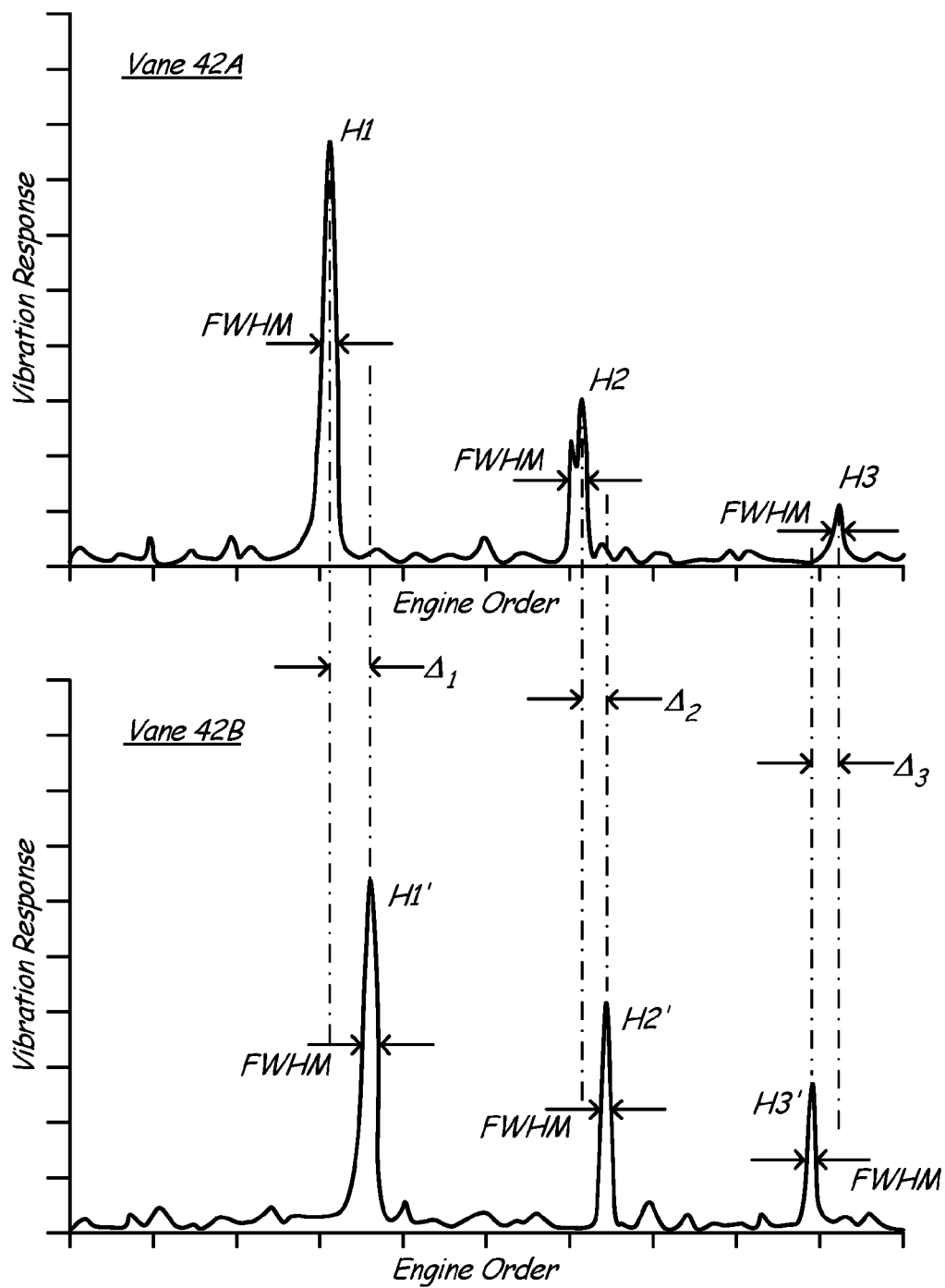
FIG. 3 is a frequency response plot comparing different mode frequencies for detuned, circumferentially adjacent vane airfoils.

FIG. 3 is a frequency response plot for de-tuned, circumferentially adjacent vane airfoils, for example vane airfoils 42A (top) and 42B (bottom) of vane assembly 41 for stator stage 40, above. Vibration response is plotted is on the vertical, in arbitrary units of amplitude or vibration energy. Frequency is plotted on the horizontal, in units of engine order or multiples of the rotational frequency.

The frequency response spectra (or vibration mode distributions) of airfoils 42A and 42B are characterized by at least three harmonics, corresponding to natural vibration frequencies of the airfoil. Lowest-order (fundamental) harmonics H1 (airfoil 42A) and H1' (adjacent vane airfoil 42B) typically have the lowest vibration frequencies, and lower vibration energies. Higher-order harmonics H2, H3 (airfoil 42A) and H2', H3' (adjacent airfoil 42B) typically have higher frequencies, and greater vibration energies.

Harmonic frequencies H1, H2, H3 and H1', H2' and H3' depend on airfoil geometry, composition, elasticity and mass distribution. Typically, lowest-order fundamental modes H1 and H1' represent half-wavelength vibrations (flexing) of the vane system, modeled as a fixed-fixed beam, with a maximum at midspan and minima at the inner and outer platforms. Higher-order modes H2, H3 and H2', H3' have increased frequency and decreased wavelength, with additional minima and maxima spaced along the span.

To shift these frequencies with respect to one another, the organic matrix materials of individual and adjacent airfoils can be selected to define different densities as a function of span height. Increasing relative density at the vibration amplitude maxima, for example, tends to decrease vibration frequencies for the corresponding modes, while decreasing relative density at the vibration maxima tends to increase vibration frequencies for the corresponding modes. Similarly, relative increases or decreases in the Young's modulus or elasticity at the stress maxima tends to increase or decrease the vibration frequencies of the corresponding modes.

The minima (nodes) and maxima (anti-nodes) have different spanwise distributions for amplitude and stress, and these spanwise distributions vary among the different vibration modes, allowing individual vibration frequencies to be shifted up or down with respect to one another by selecting composite materials with different Young's moduli, elasticities and densities as a function of span height, both within individual airfoils and with respect to different airfoils in a particular vane ring or stator stage.

Other natural vibration modes are also present, including higher-order flexing and twisting modes. Depending on frequency and coupling characteristics, these additional modes may either be manifested as independent peaks in the harmonic response spectra, or by mode shifting, mode spreading or multiple peaks (degeneracy) in the other (e.g., flexing) modes.

Note, however, that the fixed-fixed mode configuration of vane airfoils 42A and 42B is substantially different from that of a fixed-free system. This is true not only in terms of the harmonic frequency distribution, but also in terms of other mode contributions, particularly twisting modes, which are more prevalent for unshrouded rotor blades and cantilevered stator vanes. Because of the highly non-linear couplings among these different modes, moreover, it is difficult to make predictions for fixed-fixed vane geometries based on fixed-free systems.

As shown in FIG. 3, harmonics H1, H2 and H3 of vane 42A are relatively broad, as characterized by the full width at half maximum (FWHM) for each of the response peaks. The same is true for harmonics H1', H2' and H3' of adjacent airfoil 42B. This broad mode structure reflects the relatively high damping capability of the organic matrix composite construction, as compared to metal or ceramic-based composite blades, allowing vanes 42A and 42B to absorb vibration energies over a substantially wider range of operational frequencies and engine orders.

In addition, the organic composite matrix composition of adjacent vanes 42A and 42B is selected to produce different vibration responses. In this particular example, first-order (fundamental) and second-order harmonics H1', H2' of adjacent vane 42B are each shifted to relatively higher engine orders or frequencies, for example by decreasing the density of the organic matrix, or by increasing the elasticity or Young's modulus of the embedded fiber materials. Third-order harmonic H3' is shifted to lower frequencies by selecting these properties as a function of span height, for example by increasing the density at the third-order maxima, or by decreasing the Young's modulus at the third-order minima. In addition, more energy is shifted to higher-order modes H2' and H3', as compared to fundamental mode H1'.

Alternatively, harmonics H1', H2' can be shifted to lower frequencies and harmonic H3' can be shifted to higher frequency, by selectively increasing or decreasing the composite density or fiber elasticity, or both, according to the corresponding distribution of minima and maxima along the span of the airfoil. In some vane designs, the different vibration responses of adjacent airfoils are also defined by selecting different fiber materials for the adjacent airfoils, or a higher or lower density of fiber materials. Different fiber layups are also contemplated, for example with different wound fiber and cross-laid fiber orientations.

As a result, the frequencies of harmonic modes H1, H2 and H3 of vane 42A and H1', H2', and H3' of adjacent vane 42B are shifted with respect to one another, and do not substantially overlap. In particular, the peak frequency of fundamental mode H1' for vane 42B lies outside the full width at half maximum for fundamental mode H1 of vane 42B. Correspondingly, the peak frequency of fundamental mode H1 for vane 42A lies outside the full width at half maximum for fundamental mode H1' of adjacent vane 42B.

The higher-order modes are also shifted, so that the fundamental and higher-mode vibrations each have different frequencies in the vibration response functions of adjacent vanes 42A and 42B. The differences in frequency $\Delta_1$, $\Delta_2$, $\Delta_3$, moreover, are greater than the full widths at half maxima of the corresponding modes, as defined in each of adjacent blades 42A and 42B. Thus, the vibration modes of one adjacent vane airfoil (42A or 42B) lie substantially outside those of the other adjacent airfoil (42B or 42A), reducing coupling and increasing vibration damping.

In addition, vibration energies are absorbed over a broader range of frequencies and engine orders, because adjacent vanes 42A and 42B absorb energy in different mode frequencies, with shifted peaks and response distributions. As a result, overall vibration response is reduced not only for individual airfoils, but also in the discrete twin-pack and multi-pack vane assemblies, and in the stator stage as a whole. This improves service life by reducing vibration fatigue, and provides a broader range of design choices, including airfoil geometries with increased loading and improved flow turning.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. The invention, therefore, is not limited to the particular examples disclosed herein, but includes all embodiments falling within the scope of the appended claims.

The invention claimed is:

1. A vane assembly comprising:
   circumferentially adjacent airfoils formed of composite materials, the circumferentially adjacent airfoils having matching exterior geometries defined by pressure and suction surfaces extending axially from a leading edge to a trailing edge and radially from a root section to a tip section;
   an inner platform attached to each of the circumferentially adjacent airfoils at the root section; and
   an outer platform attached to each of circumferentially adjacent airfoils at the tip section;
   wherein the composite materials are selected to define a vibration mode with different vibration frequencies in the circumferentially adjacent airfoils, the different vibration frequencies separated by more than a full width of the vibration mode at half maximum.

2. The vane assembly of claim 1, wherein the vibration mode comprises a fundamental mode of vibration, the fundamental mode having the different vibration frequencies in the circumferentially adjacent airfoils.

3. The vane assembly of claim 1, wherein the vibration mode comprises a higher-order mode of vibration, the higher-order mode having the different vibration frequencies in the circumferentially adjacent airfoils.

4. The vane assembly of claim 1, wherein the matching exterior geometries define substantially identical pressure surfaces and substantially identical suction surfaces for each of the circumferentially adjacent airfoils.

5. The vane assembly of claim 1, wherein the inner and outer platforms are formed as unitary structures attached to each of the circumferentially adjacent airfoils to define a multi-pack stator vane assembly.

6. The vane assembly of claim 5, wherein the circumferentially adjacent airfoils consist of two circumferentially adjacent airfoils defining a twin-pack stator vane assembly.

7. The vane assembly of claim 1, wherein the composite materials of the circumferentially adjacent airfoils comprise organic matrix materials selected to define different densities for the circumferentially adjacent airfoils, as a function of span height.

8. The vane assembly of claim 1, wherein the composite materials of the circumferentially adjacent airfoils comprise fiber materials selected to define different elasticities for the circumferentially adjacent airfoils, as a function of span height.

9. A stator stage comprising a plurality of vane assemblies as specified in claim 1, the plurality of vane assemblies circumferentially arranged about an axis to define a flow duct.

10. A gas turbine engine comprising the stator stage of claim 9.

11. A stator vane assembly comprising:
    first and second circumferentially adjacent airfoils with matching exterior geometries defined by pressure and suction surfaces extending from a leading edge to a trailing edge and from a root section to a tip section, the first airfoil formed of organic matrix composite materials defining a first vibration response and the second airfoil formed of organic matrix composite materials defining a second vibration response;
    inner and outer platforms attached to each of the first and second airfoils at the root section and at the tip section, the inner and outer platforms defining a flow duct therebetween;
    wherein the first and second vibration responses define different fundamental mode frequencies for the first and second airfoils, the fundamental mode frequencies separated by more than a full width at half maximum.

12. The stator vane assembly of claim 11, wherein the matching exterior geometries define substantially identical load characteristics for the first and second circumferentially adjacent airfoils.

13. The stator vane assembly of claim 11, wherein the first and second vibration responses define different higher-order mode frequencies for the first and second airfoils, the higher-order mode frequencies separated by more than a full width at half maximum.

14. The stator vane assembly of claim 13, wherein the organic matrix composite materials have different densities in the first and second airfoils, the different densities selected to differentiate the higher-order mode frequencies in the first and second airfoils.

15. The stator vane assembly of claim 14, wherein the organic matrix composite materials have different elasticities in the first and second airfoils, the different elasticities selected to differentiate the higher-order mode frequencies in the first and second airfoils.

16. A stator vane stage comprising:
    first and second circumferentially adjacent airfoils formed of organic matrix composite materials, the first and second airfoils having substantially identical external geometries defined by pressure and suction surfaces extending axially from a leading edge to a trailing edge and radially from a root section to a tip section;
    an inner platform attached to the first and second airfoils at the root section; and
    an outer platform attached to the first and second airfoils at the tip section, the inner and outer platforms forming a flow duct therebetween;
    wherein the organic matrix composite materials define different vibration responses in the first and second airfoils, the different vibration responses having vibration modes with different vibration frequencies in the first and second airfoils, the different vibration frequencies separated by more than a full width of the vibration modes at half maximum.

17. The stator vane stage of claim 16, wherein the vibration modes comprise a fundamental mode and a second-order mode or a third-order mode, each of the modes having different vibration frequencies in the first and second airfoils.

18. The stator vane stage of claim 16, wherein the organic matrix composite materials comprise different organic matrix and fiber materials in the first and second airfoils.

19. The stator vane stage of claim 18, wherein the external geometries of the first and second airfoils define circumferentially adjacent airfoils with substantially identical turning and loading characteristics.

20. A turbofan engine comprising a power core and the stator vane stage of claim 16, wherein the stator vane stage is coaxially disposed about the power core in a fan duct.

* * * * *